United States Patent
Kunita et al.

(10) Patent No.: US 10,323,771 B2
(45) Date of Patent: Jun. 18, 2019

(54) FLUID CONTROL VALVE AND RECORDING MEDIUM WITH CONTROL PROGRAM THEREOF RECORDED THEREIN

(71) Applicant: HORIBA STEC, Co., Ltd., Kyoto-shi, Kyoto (JP)

(72) Inventors: Daichi Kunita, Kyoto (JP); Atsushi Ieki, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/283,757

(22) Filed: Oct. 3, 2016

(65) Prior Publication Data

US 2017/0102095 A1    Apr. 13, 2017

(30) Foreign Application Priority Data

Oct. 8, 2015   (JP) ................................ 2015-200289

(51) Int. Cl.
*F16K 37/00*        (2006.01)
*G01D 3/02*         (2006.01)
(Continued)

(52) U.S. Cl.
CPC ............ *F16K 37/0083* (2013.01); *F16K 1/12* (2013.01); *F16K 31/007* (2013.01);
(Continued)

(58) Field of Classification Search
CPC ........... Y10T 137/8242; F16K 37/0041; F16K 37/0083; G01D 3/022; G05D 7/0635
See application file for complete search history.

(56) References Cited

U.S. PATENT DOCUMENTS 4,132,272 A * 1/1979 Holloway ............ A01B 63/114
                                                    172/2
5,165,448 A * 11/1992 Handte ................. F15B 13/043
                                                    137/625.62
(Continued)

FOREIGN PATENT DOCUMENTS

CN        202859864 U    4/2013
CN        103574129 A    2/2014
(Continued)

OTHER PUBLICATIONS

State Intellecutal Property Office of the People's Republic of China, Office Action and Search Report Issued in Application No. 201610874019.8, dated Feb. 2, 2019, 13 pages.

*Primary Examiner* — Atif H Chaudry
(74) *Attorney, Agent, or Firm* — Alleman Hall Creasman & Tuttle LLP

(57) ABSTRACT

The present invention provides a fluid control valve that improves usability by eliminating misunderstanding of a user. The fluid control valve includes a valve seat, a valve body disposed to be approachable to and separable from the valve seat, an actuator configured to move the valve body in an approaching or separating direction, a positional information detection part configured to detect a value corresponding to a relative position of the valve body with respect to the valve seat, and a position output part configured to set, irrespective of positional information acquired by the positional information detection part at an opening start position of the valve body, the opening start position to position zero.

4 Claims, 6 Drawing Sheets

(51) Int. Cl.
*G05D 7/06* (2006.01)
*F16K 1/12* (2006.01)
*F16K 31/00* (2006.01)

(52) U.S. Cl.
CPC ...... *F16K 37/0041* (2013.01); *F16K 37/0091* (2013.01); *G01D 3/022* (2013.01); *G05D 7/0635* (2013.01); *Y10T 137/8242* (2015.04)

(56) References Cited

U.S. PATENT DOCUMENTS

| | | | | |
|---|---|---|---|---|
| 5,197,508 | A * | 3/1993 | Gottling | F16K 11/04 137/1 |
| 6,155,283 | A * | 12/2000 | Hansen | G05B 13/042 137/1 |
| 2010/0139775 | A1 | 6/2010 | Ohmi et al. | |
| 2011/0220071 | A1* | 9/2011 | Horiba | F02M 25/0836 123/520 |
| 2014/0374634 | A1* | 12/2014 | Ohtsuki | G05D 7/0635 251/129.06 |

FOREIGN PATENT DOCUMENTS

| | | |
|---|---|---|
| JP | 2013050158 A | 3/2013 |
| JP | 2015121898 A | 7/2015 |

\* cited by examiner

FLUID CONTROL VALVE AND RECORDING MEDIUM WITH CONTROL PROGRAM THEREOF RECORDED THEREIN

BACKGROUND OF THE INVENTION

Field of the Invention

The present invention relates to a fluid control valve used for controlling the flow rate or pressure of a fluid, and to a control program for use in the fluid control valve.

Background Art

As shown in Patent Document 1, a conventional fluid control valve includes a valve seat, a valve body disposed to be approachable to and separable from the valve seat, and an actuator to move the valve body. The fluid control valve is used for controlling the flow rate or pressure of a fluid so as to reach a target value by causing the actuator to regulate opening between the valve seat and the valve body.

As shown in Patent Document 2, there is one in which the above fluid control valve is provided with a position sensor to measure a position of the valve body with respect to the valve seat. The latter fluid control valve performs position control by using the position of the valve body obtained by the position sensor. This makes it possible to control the flow rate without being affected by hysteresis of the actuator with respect to a driving voltage (current), a creep phenomenon of the valve body, or a time-dependent change of the fluid control valve.

PRIOR ART DOCUMENTS

Patent Documents

Patent Document 1: Japanese Unexamined Patent Publication No. 2013-50158
Patent Document 2: Japanese Unexamined Patent Publication No. 2015-121898

SUMMARY OF THE INVENTION

Problems to be Solved by the Invention

With the latter fluid control valve, a user is capable of checking the position of the valve body by an output of the position sensor. However, the fluid does not flow immediately after the valve body being in its fully closed state is moved in a valve opening direction. This is because the fluid control valve has a position at which the fluid starts to flow (an opening start position) and a region extending up to there (a dead zone) as shown in FIG. 6. The opening start position and the dead zone are different from fluid control valve to fluid control valve. Additionally, it is not that as the output of the position sensor, zero is outputted at the position of the valve body in the fully closed state and at the opening start position.

It is consequently difficult for the user to determine whether the valve body actually goes beyond the opening start position merely by checking the position of the valve body from the output of the position sensor. This may lead to misunderstandings that clogging, failure, or the like occurs in the fluid control valve.

Accordingly, the present invention has been made to solve the above problems and has for its main object to improve usability by eliminating the misunderstanding of the user.

Means of Solving the Problems

A fluid control valve according to the present invention includes a valve seat, a valve body disposed to be approachable to and separable from the valve seat, an actuator configured to move the valve body in an approaching or separating direction, a positional information detection part configured to detect a value corresponding to a relative position of the valve body with respect to the valve seat, and a position output part configured to set, irrespective of positional information acquired by the positional information detection part at an opening start position of the valve body, the opening start position to position zero.

With the fluid control valve, the position output part sets the opening start position to the position zero irrespective of the positional information acquired by the positional information detection part at the opening start position of the valve body. This makes it possible for a user to recognize the opening start position of the valve body as being the position zero, without being bothered by an output of the positional sensor. It is therefore possible to improve the usability by eliminating the misunderstanding of the user.

By using the opening start position of the valve body as the position zero, it is possible to perform the fluid control without being affected by individual difference of the fluid control valve. It is also possible to eliminate accuracy error of the fluid control due to the individual difference of the fluid control valve.

The position output part preferably sets a position of the valve body to the position zero when the positional information acquired by the positional information detection part indicates a position closer to the valve seat than the opening start position. When the valve body is located closer to the valve seat than the opening start position, it is a state in which no fluid flows. Setting this state to the position zero allows the user to directly recognize this.

The position zero to be displayed needs to be changed with a time-dependent change of the opening start position of the valve body. Therefore, the position zero is preferably corrected using an amount of deviation between positional information acquired by the positional information detection part in a state in which a full close signal is already outputted to the actuator, and an initial value of positional information acquired by the positional information detection part in the state. This makes it possible to eliminate the misunderstanding of the user due to the time-dependent change of the opening start position and a change in position zero along with the time-dependent change. The correction of the position zero needs only to compare output signals of the positional sensor by outputting the full close signal to the actuator. Namely, there is no need to perform the identification of the position zero again, thereby facilitating the correction.

Effects of the Invention

With the present invention, irrespective of the positional information acquired by the positional information detection part at the opening start position of the valve body, the opening start position of the valve body is set to the position zero. It is therefore possible to improve the usability by eliminating the misunderstanding of the user.

DESCRIPTION OF THE EMBODIMENTS

One embodiment of a mass flow controller with a fluid control valve according to the present invention incorporated therein is described below with reference to the drawings.

The mass flow controller 100 of the present embodiment is used in, for example, a semiconductor manufacturing process.

Figure 1:
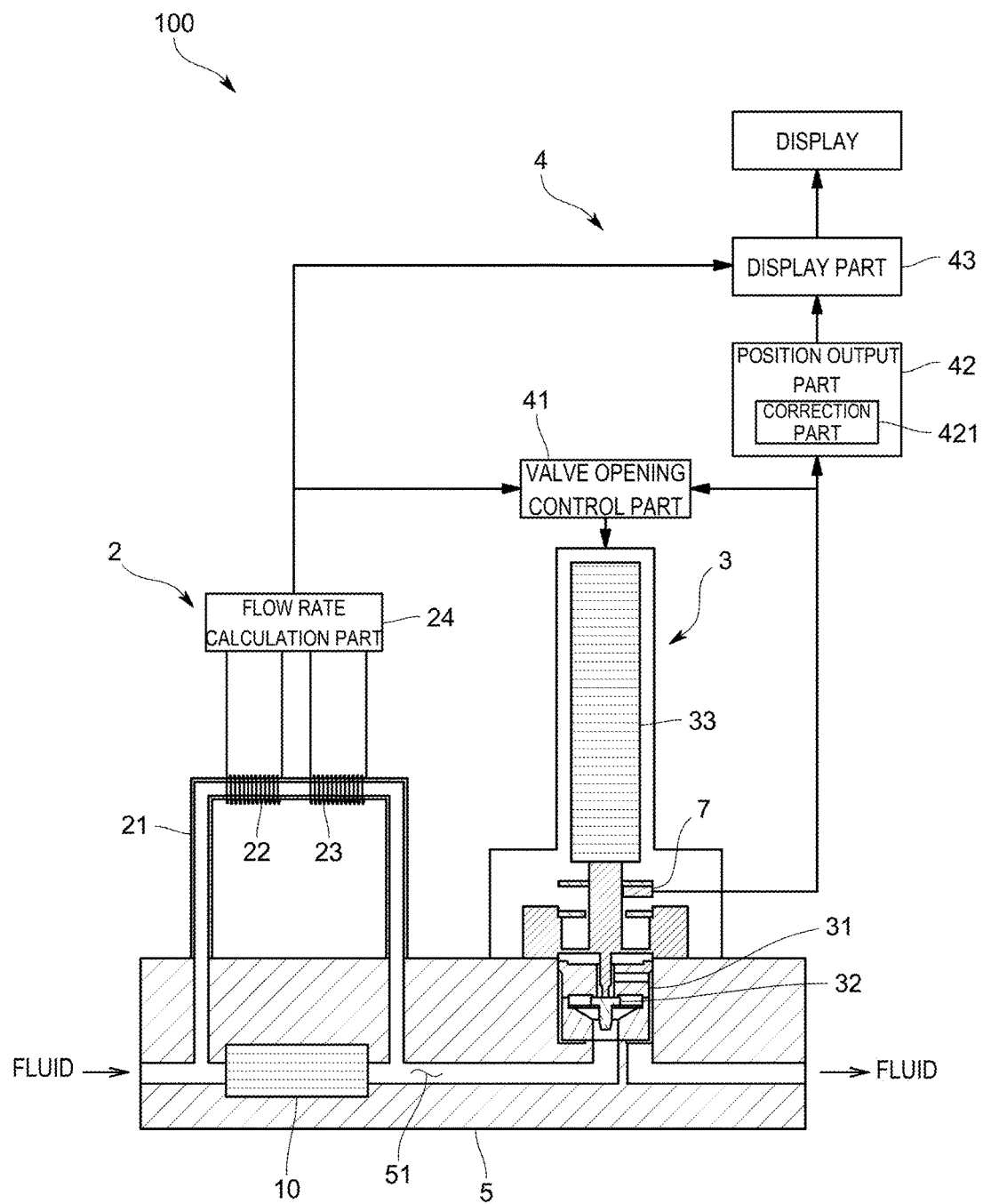
FIG. 1 is a schematic diagram that shows a configuration of a mass flow controller of an embodiment.

Specifically, as shown in FIG. 1, the mass flow controller 100 includes a body 5 provided with a flow channel 51 configured to allow a fluid, such as gas for a semiconductor process, pass therethrough, a flow rate measuring mechanism 2 to measure a flow rate of the fluid passing through the flow channel 51, a fluid control valve 3 to control the flow rate of the fluid passing through the flow channel 51, and a control device 4 to control a valve opening of the fluid control valve 3 so that a measured flow rate outputted by the flow rate measuring mechanism 2 approaches a predetermined set flow rate. These components are described in detail below.

The body 5 is made into a block shape configured to allow the flow channel 51 to penetrate therethrough. An external inflow pipe (not shown) is connected to an upstream end of the flow channel 51. An external outflow pipe is connected to a downstream end of the flow channel 51.

The flow rate measuring mechanism 2 is a thermal flow rate measuring mechanism. Specifically, the flow rate measuring mechanism 2 has a sensor flow channel pipe 21 that splits the fluid by being branched from the flow channel 51, and a pair of heating resistors 22 and 23 disposed in the sensor flow channel pipe 21. A temperature difference between the pair of heating resistors 22 and 23 occurs depending on a mass flow rate of the fluid passing through the sensor flow channel pipe 21. Then, in the flow rate measuring mechanism 2, a flow rate calculation part 24 detects the temperature difference between the pair of heating resistors 22 and 23 in order to measure the mass flow rate of the sensor flow channel pipe 21. The flow rate calculation part 24 also calculates a mass flow rate in the flow channel 51 on the basis of a splitting ratio between the flow channel 51 and the sensor flow channel pipe 21. A laminar flow element 10 is disposed between a branch point and a junction point of the sensor flow channel pipe 21 in the flow channel 51.

The fluid control valve 3 is, for example, a normally closed type flow rate control valve disposed on the flow channel 51.

Figure 2:
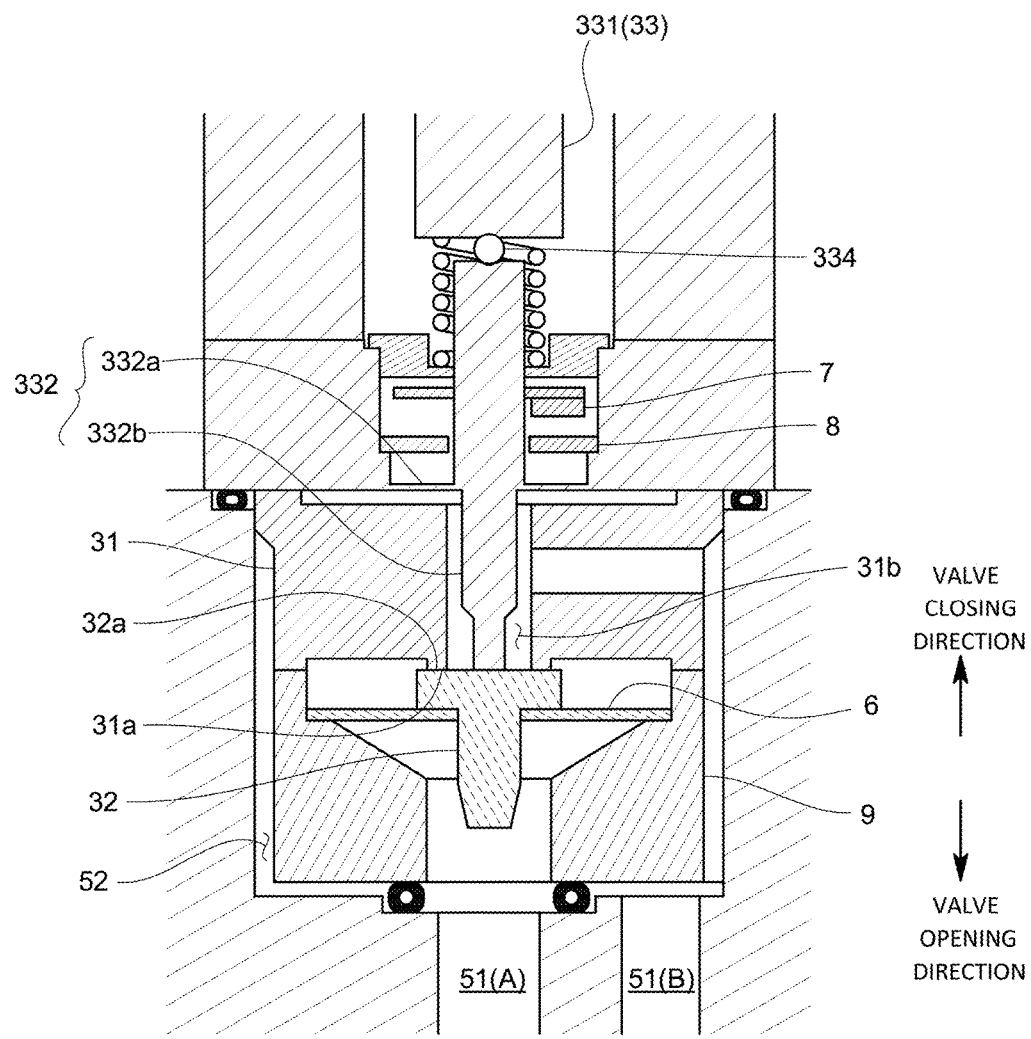
FIG. 2 is a diagram that shows a configuration of a fluid control valve of the embodiment.

Specifically, as shown in FIG. 2, the fluid control valve 3 includes a valve seat member 31 and a valve body member 32 as being a pair of valve members accommodated in the body 5, and an actuator 33 that drives the valve body member 32 to set a valve opening, namely, a clearance between the valve seat member 31 and the valve body member 32.

The valve seat member 31 becomes the valve seat and has a valve seat surface 31a on a lower surface thereof as shown in FIG. 2. The valve seat member 31 has therein an internal flow channel 31b whose one end communicates with the valve seat surface 31a and whose other end communicates with a side peripheral surface. The other end of the internal flow channel 31b may communicate with an upper surface of the valve seat member 31. A plurality of the internal flow channels 31b may be provided.

The valve seat member 31 is accommodated in a cylindrical recess 52 disposed in the body 5. The recess 52 is disposed so as to divide the flow channel 51 of the body 5. An upstream side flow channel of the flow channel 51 being divided by the recess 52 (hereinafter also referred to as "upstream side flow channel") 51(A) communicates with, for example, a bottom surface of the recess 52, and a flow channel located downstream of the recess 52 (hereinafter also referred to as "downstream side flow channel") 52(B) communicates with, for example, a side surface of the recess 52. The recess 52 forms a valve chamber configured to dispose therein the valve seat member 31 and the valve body member 32.

In a state in which the valve seat member 31 is accommodated in the recess 52, the upstream side flow channel 51(A) and the downstream side flow channel 51(B) communicate with each other via the internal flow channel 31b of the valve seat member 31.

The valve body member 32 becomes the valve body and is disposed opposite to the valve seat member 31 in the recess 52 of the body 5. The valve body member 32 has a seating surface 32a formed on the upper surface thereof. The seating surface 32a is configured to come into contact with the valve seat surface 31a to close the internal flow channel 31b that communicates with the valve seat surface 31a.

The valve body member 32 is supported by a valve body return spring 6 so as to be approachable to and separable from the valve seat member 31 in the recess 52 of the body 5. The valve body return spring 6 is configured to energize the valve body member 32 toward the valve seat member 31. In other words, the valve body member 32 is energized in a direction from an open state toward a closed state (a valve closing direction) by the valve body return spring 6. The valve body return spring 6 of the present embodiment is a leaf spring. The valve body return spring 6 is secured to a support member 9 disposed in the recess 52 or, alternatively, may be secured to an internal surface of the recess 52. Instead of the leaf spring, an elastic body capable of energizing the valve body member 32 may be used as the valve body return spring 6. The elastic body may directly or indirectly energize the valve body member 32.

The valve body member 32 is energized upon receipt of a driving force from the actuator 33. Then, the valve body member 32 is shifted from the closed state in which the valve body member 32 comes into contact with the valve seat member 31 so as to shut off the upstream side flow channel 51(A) and the downstream side flow channel 51(B), to the open state in which the valve body member 32 separates from the valve seat member 31 so as to cause the upstream side flow channel 51(A) and the downstream side flow channel 51(B) to communicate with each other.

The actuator 33 includes a piezo stack 331 formed by stacking, for example, a plurality of piezo elements one upon another, and an operating body 332 to be displaced by extension of the piezo stack 331.

A tip of the piezo stack 331 is connected to the operating body 332 with an intermediate connection member 334 interposed therebetween.

The operating body 332 has a diaphragm member 332a, and a connecting bar 332b that is disposed at the center of the diaphragm member 332a and configured to come into contact with the valve body member 32. The connecting bar 332b is configures to penetrate through the center of the valve seat member 31 (the internal flow channel 31b in the present embodiment) and then come into contact with the valve seat member 32.

Upon application of a voltage to the piezo stack 331, the piezo stack 331 extends, and the operating body 332 energizes and moves the valve body member 32 in the valve opening direction. Accordingly, the valve seat surface 31a and the seating surface 32a are separated from each other by a distance according to an applied voltage, thus leaving a clearance therebetween. The upstream side flow channel 51(A) and the downstream side flow channel 51(B) communicate with each other with the clearance interposed therebetween. The valve body member 32 enters the closed state in a normal state in which no voltage is applied to the actuator 33.

The fluid control valve 3 of the present embodiment includes a positional information detection part 7 to detect a value according to a relative position of the seating surface 32a with respect to the valve seat surface 31a. As the value according to the relative position, there are, for example, a relative distance between the valve seat surface 31a (the valve seat member 31) and the seating surface 32a (the valve body member 32) or a value relating to the relative distance, the valve opening or a value relating to the valve opening, or the driving voltage of the actuator 33 or a value relating to the driving voltage.

The positional information detection part 7 of the present embodiment is a positional sensor to measure displacement of the seating surface 32a with respect to the valve seat surface 31a. The positional sensor 7 is disposed on the valve member 32 or a member configured to be moved together with the valve member 32. The positional sensor 7 measures a relative distance with respect to the valve seat member 31 or other stationary side member. The positional sensor 7 of the present embodiment is an eddy current sensor. The eddy current sensor 7 is disposed at the connecting bar 332b of the operating body 332. A target 8 having conductivity with respect to the stationary side member is disposed oppositely to an approaching and separating direction of the valve body member 32 (a moving direction of the connecting bar 332b). The eddy current sensor 7 measures a distance to the target 8.

The control device 4 has a valve opening control part 41 to control the valve opening of the fluid control valve 3 by acquiring a flow rate measuring signal from the flow rate measuring mechanism 2 and positional information (a position measuring signal) from the positional sensor 7. The valve opening control part 41 controls the valve opening by performing positional control of the valve body member 32 on the basis of the positional information (position measuring signal (counts)) from the positional sensor 7.

The control device 4 also has a position output part 42. The position output part 42 takes the positional information acquired by the positional sensor 7 in an opening start position X of the valve body member 32 as being that the position of the valve body member 32 corresponds to position zero, and then outputs this to a display part 43. By installing a control program into the control device 4 having, for example, a CPU, memory, an input/output interface, functions of the control device 4 are implementable at least on the position output part 42.

The position output part 42 identifies the opening start position X from the flow rate measuring signal from the flow rate measuring mechanism 2 and the position measuring signal from the positional sensor 7. Irrespective of the position measuring signal at the opening start position X, the position output part 42 sets the identified opening start position X to the position zero of the valve body member 32. The position measuring signal from the positional sensor 7 is not necessarily zero even for the position of the valve body member 32 in the fully closed state or for the opening start position X.

The phrase "setting to the position zero" includes, besides setting the opening start position X to numerical value zero (FIG. 0), setting to a numeric value making it possible to recognize that the position is zero, for example, a predetermined value good to discriminate which consists of consecutive zeros from the first digit to a predetermined number of digits.

Figure 3:
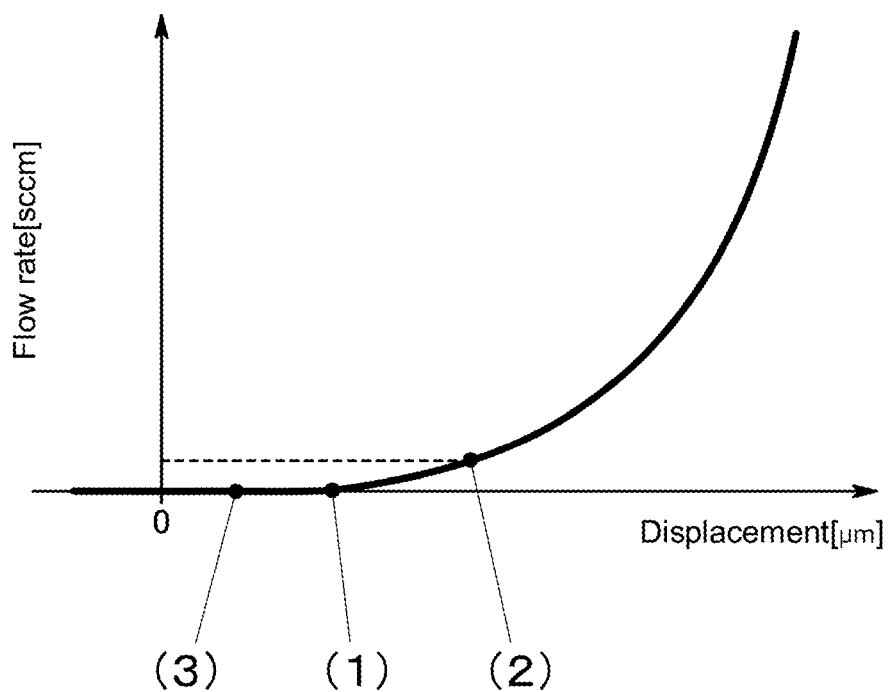
FIG. 3 is a diagram that shows three forms of an opening start position of a valve body member of the embodiment.

As shown in FIG. 3, the opening start position X of the valve body member 32 is (i) a position of the valve body member 32 (specifically the seating surface 32a) at a time point that the measured flow rate value (sccm) indicated by the flow rate measuring signal exceeds zero and the fluid starts to flow (refer to point (1) in FIG. 3), (ii) a position of the valve body member 32 at a time point that the measured flow rate value reaches a predetermined value larger than zero (refer to point (2) in FIG. 3), or (iii) a position being shifted by a predetermined amount toward the valve seat member 31 from the position of the valve body member 32 at the time point that the measured flow rate value exceeds zero and the fluid starts to flow (refer to point (3) in FIG. 3). The position of the point (3) is a position between the position of the valve body member 32 in the fully closed state and the position of the point (1).

The opening start position X is identified by, for example, gradually displacing the valve body member 32 from the fully closed state in which a full close signal is already outputted to the actuator 33, and also acquiring a flow rate measuring signal from the flow rate measuring mechanism 2 on that occasion. Alternatively, the opening start position X may be a relative distance (m) indicated by the position measuring signal, or a position measuring signal of the positional sensor 7 (for example, a signal value (counts) before distance conversion. Besides that, when the opening start position X is identified by a driving voltage of the actuator 33, one which is indicated by the driving voltage may be employed.

When the position measuring signal of the positional sensor 7 indicates a position closer to the valve seat member 31 (specifically the valve seating surface 31a) than the opening start position X, the positon output part 42 sets the position of the valve body member 32 to position zero but not to a minus value. The position zero in this case is the same as a numeric value set to the opening start position X (i.e. zero or a predetermined value).

With the foregoing configuration, the position output part 42 replaces a raw position measuring signal at the opening start position X with zero (0). When located closer to an open side (the side opposite the valve seating surface 31 a) than the opening start position X, the position output part 42 outputs a value obtainable by subtracting the raw position measuring signal at the opening start position X from the raw position measuring signal at that position, namely, a value counted from zero. When located closer to a closed side (the side closer to the valve seating surface 31a) than the opening start position X, the position output part 42 outputs zero.

Figure 4:
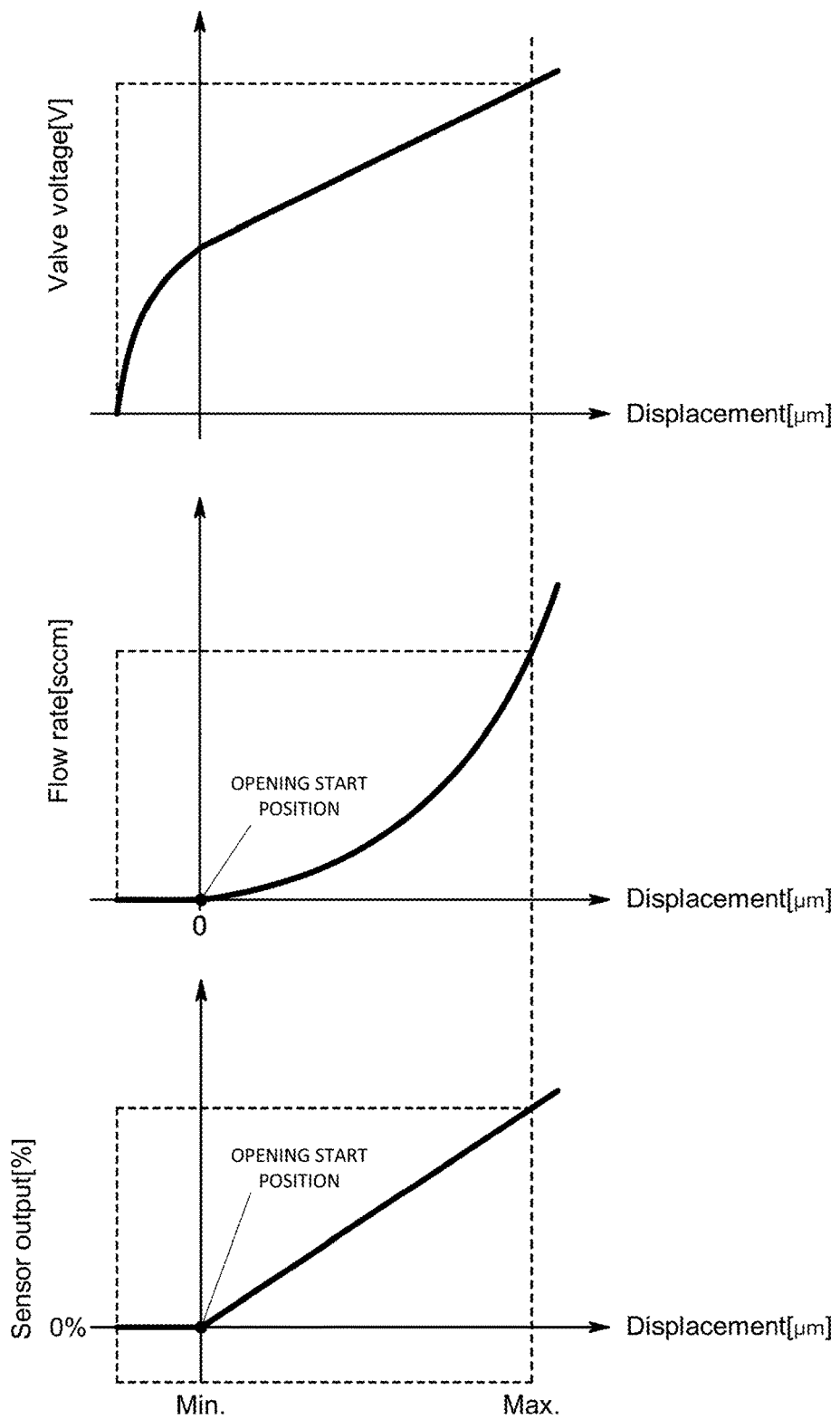
FIG. 4 is a diagram that shows a display from of a position output part of the embodiment.

As shown in FIG. 4, the display part 43 displays, on a display, a graph that shows a relationship between the measured flow rate value (sccm) indicated by the flow rate measuring signal and the relative distance (μm) indicated by the position measuring signal. As the relative distance (μm)

plotted on the abscissa, the position measuring signal of the positional sensor 7 (a signal value (counts) before distance conversion) may be employed. As the unit of the abscissa that indicates the position of the valve body member 32, "m", a percentage (%) with respect to the position of the valve body member 32 in a predetermined valve opening, or other various units may be employed besides "μm". As the unit of the ordinate that indicates the measured flow rate value, a percentage (%) with respect to the predetermined flow rate, or other various units may be employed besides "sccm".

In addition to the graph that shows the relationship between the measured flow rate value and the relative distance, the display part 43 also displays a graph that shows a relationship between an applied voltage (V) to the actuator 33 and the relative distance (μm), and a graph that shows a relationship between a percentage (%) of an output signal with respect to an output signal of the positional sensor 7 at a maximum flow rate or a predetermined flow rate, and the relative distance (μm).

In the above graphs, when the opening start position X being set by the positon output part 42 corresponds the position zero of the valve body member 32, the display part 43 displays this so as to be visible by a user, irrespective of the positional information about the valve body member 32 at the opening start position X. With the present embodiment, as shown in FIG. 4, the display part 43 performs a display so that the opening start position X becomes zero and corresponds to the intersection of the abscissa and the ordinate. Alternatively, the display part 43 may display a mark, such as a display line or an arrow, which indicates the opening start position X as being the position zero.

When the position measuring signal of the positional sensor 7 indicates a position closer to the valve seat member 31 (specifically the valve seating surface 31a) than the opening start position X, the display part 43 displays the position of the valve body member 32 (the seating surface 32a) as the position zero. In the graph that shows the relationship between the percentage (%) of the position measuring signal of the positional sensor 7 with respect to the position measuring signal at the maximum flow rate or the predetermined flow rate, and the relative distance (m), the display part 43 sets the position measuring signal of the positional sensor at the opening start position X to zero, and also set to zero in other cases.

The position output part 42 of the present embodiment has a correction part 421 (correction function) to correct the position zero.

Using an amount of deviation between the position measuring signal of the positional sensor 7 in a state in which the full close signal is already outputted to the actuator 33, and the position measuring signal of the positional sensor 7 in the same state as above, the correction part 421 of the position output part 42 makes a correction by shifting the already set position zero by the amount of deviation. An initial value is a position measuring signal of the positional sensor 7 in the fully closed state, which is already acquired in the most recent measurement of the opening start position.

Figure 5:
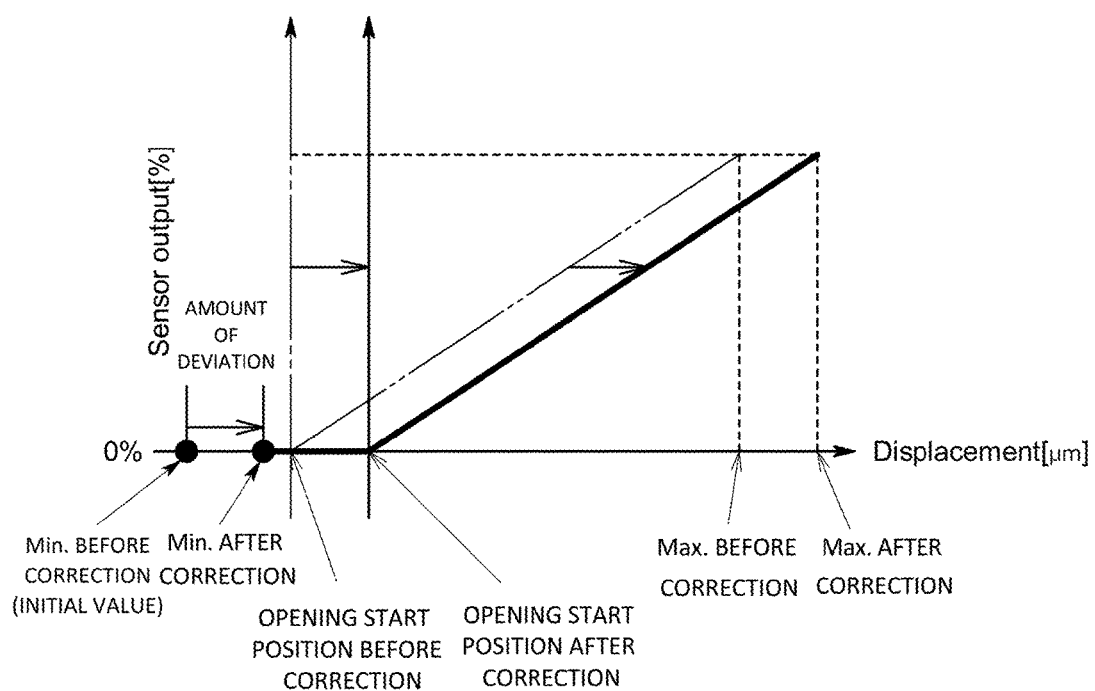
FIG. 5 is a diagram that shows a method for correcting the opening start position (position zero) of the embodiment.
Figure 6:
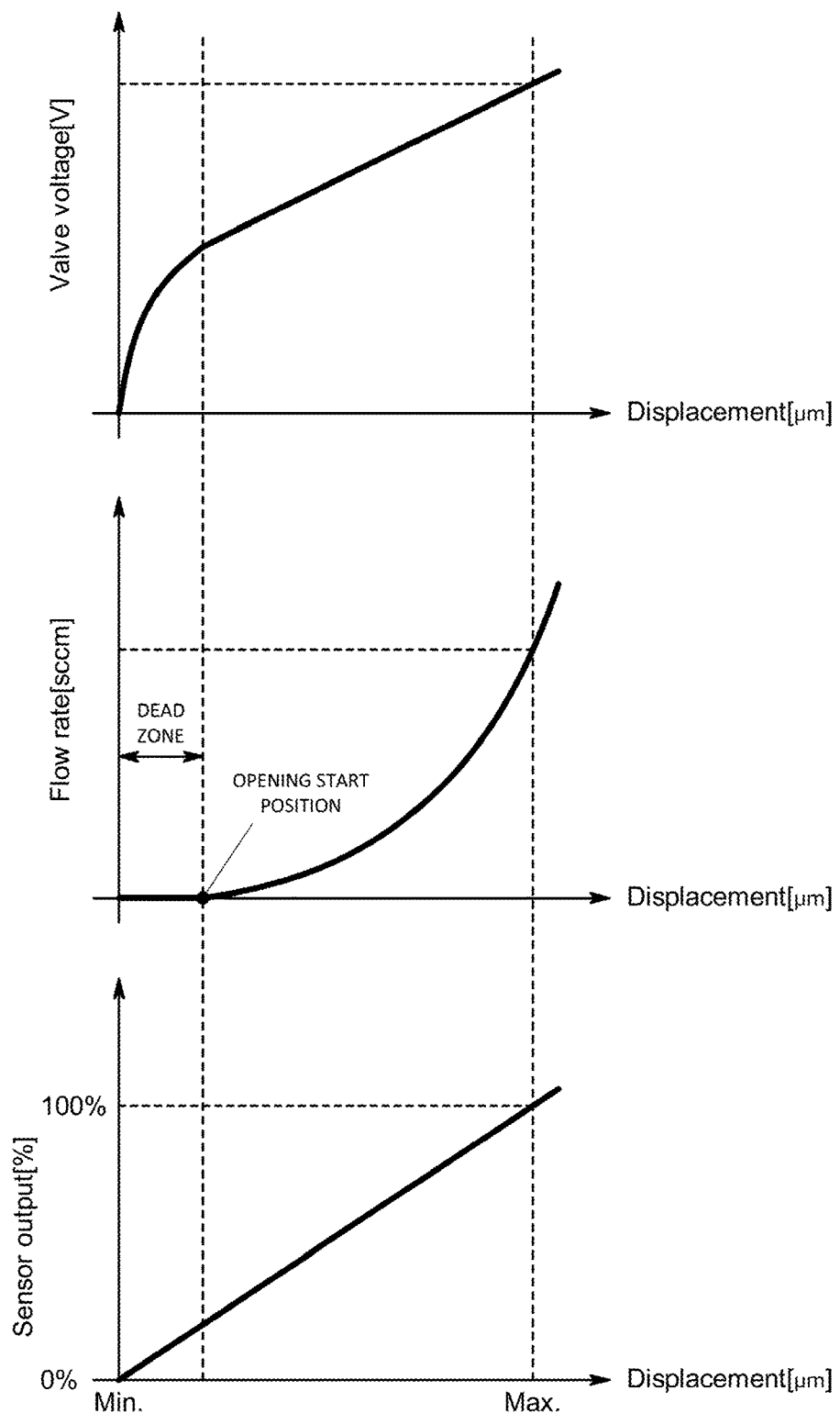
FIG. 6 is a diagram that shows the opening start position and a dead zone of the fluid control valve.

To be specific, as shown in FIG. 5, the correction part 421 calculates a position measuring signal at an opening start position X' after correction by subtracting (offsetting) the amount of deviation from a position measuring signal at an opening start position X before correction.

It is possible to configure so that the position correction made by the correction part 421 is automatically made on a predetermined cycle basis or at an occurrence of a predetermined event. Besides that, it is possible to configure so that the position correction is made upon acceptance of an input signal to be inputted through a user's operation.

The display part 43 displays, on the display, the opening start position X' after correction as being the position zero.

With the mass flow controller 100 so configured, the position output part 42 sets the opening start position X to the position zero of the valve body member 32 irrespective of the positional information (position measuring signal) about the valve body member 32 at the opening start position X, and the display part 43 displays the opening start position X as the position zero. This makes it possible for the user to recognize the opening position X of the valve body member 32 as being the position zero, without being bothered by the output of the positional sensor 7. It is therefore possible to improve the usability by eliminating the misunderstanding of the user.

By using the opening start position X of the valve body member 32 as the position zero, it is possible to perform the fluid control without being affected by individual difference of the fluid control valve 3. It is also possible to eliminate accuracy error of the fluid control due to the individual difference of the fluid control valve 3.

The present invention is not limited to the above embodiment.

For example, the positional information detection part 7 is not limited to the eddy current sensor of the above embodiment, but may be a capacitive sensor, an optical sensor such as an optical interference sensor, or one which acquires positional information by detecting a driving voltage of the actuator.

Although the fluid control valve of the above embodiment is of the normally closed type, the fluid control valve of a normally open type also produces similar effects.

Further, in the case of the fluid control device (mass flow controller) with the fluid control valve incorporated therein as in the above embodiment, the control part (CPU) of the fluid control valve and the control part (CPU) of the fluid control device may be commonalized, and the function of the position output part may be imparted to a common CPU.

Although the mass flow controller with the fluid control valve incorporated therein has been described in the above embodiment, it is, of course, possible to configure as a fluid control valve single object. As the fluid control valve, a pressure control valve to control the pressure of the fluid may be employed instead of the flow rate control valve as in the above embodiment.

The configuration of the fluid control valve is not limited to that in the above embodiment, but may be one which is capable of switching between shut-off and communication of a flow channel by disposing the valve seat in the flow channel and disposing the valve body so as to be approachable to and separable from the valve seat. The fluid control valve may be of a normally open type.

With the above embodiment, the opening start position is corrected by the amount of deviation between the output signal of the positional sensor in the fully closed state and the initial value. Alternatively, with the same method as in the above embodiment, the opening start position may be updated and positional information at the opening start position after being updated may be displayed as zero position. In other words, an opening start position after being subjected to time-dependent change may be identified by gradually displacing the valve body member 32 from the fully closed state in which the full close signal is already outputted to the actuator 33, and also acquiring a flow rate measuring signal from the flow rate measuring mechanism 2 on that occasion.

Although the opening start position being stored is corrected in the configuration of the above embodiment, the opening start position X may be identified from the flow rate measuring signal from the flow rate measuring mechanism 2, and from the position measuring signal from the positional sensor 7 every time the valve body member in the fully closed state is opened, or for each predetermined number of times.

As the flow rate measuring mechanism of the above embodiment, it is possible to employ, besides thermal method, various flow rate measuring methods, such as pressure method, Coriolis method, and ultrasonic method.

Although the valve opening control part 41 of the above embodiment controls the valve opening by using the positional information (position measuring signal (counts) from the positional sensor 7, the valve opening control part 41 may also control the valve opening on the basis of the position zero to be set by the position output part 42.

The use of the fluid control valve and the mass flow controller of the above embodiment is not limited to the semiconductor manufacturing process.

It is to be understood that the present invention is not limited to the above embodiments in other respects, and that various modifications can be made therein without departing from the spirit and scope of the present invention.

LIST OF REFERENCE CHARACTERS 100 fluid control valve
31 valve seat
31a valve seating surface
32 valve body
32a seating surface
33 actuator
41 valve opening control part
42 position output part
43 display part
X opening start position
7 positional sensor

What is claimed is:

1. A fluid control valve, comprising:
 a valve seat;
 a valve body disposed to be approachable to and separable from the valve seat;
 an actuator including an operating body, the actuator configured to move the valve body via contact of the operating body with the valve body in an approaching or separating direction;
 a positional information detection part arranged on the operating body and configured to detect values corresponding to relative positions of the valve body with respect to the valve seat, the relative positions including valve displacement positions in a dead zone that do not effect flow through the fluid control valve;
 a position output part configured to set, irrespective of positional information acquired by the positional information detection part at an opening start position of the valve body at which flow is effected through the fluid control valve, the opening start position as position zero; and
 a display part configured to display the opening start position, which is output from the position output part, as position zero of the valve body.

2. The fluid control valve according to claim 1, wherein the position output part is configured to set a position of the valve body as position zero even when positional information acquired by the positional information detection part indicates a position closer to the valve seat than the opening start position.

3. The fluid control valve according to claim 1, wherein the position output part is configured to correct the position zero by using an amount of deviation between positional information acquired by the positional information detection part in a state in which a full close signal is already outputted to the actuator, and an initial value of positional information acquired by the positional information detection part in the state.

4. A recording medium having recorded therein a control program and configured to store the control program for controlling a fluid control valve comprising a valve seat, a valve body disposed to be approachable to and separable from the valve seat, an actuator including an operating body, the actuator configured to move the valve body via contact of the operating body with the valve body in an approaching or separating direction, a positional information detection part arranged on the operating body and configured to detect values corresponding to relative positions of the valve body with respect to the valve seat, the relative positions including valve displacement positions in a dead zone that do not effect flow through the fluid control valve; and a display part configured to display an opening start position of the valve body at which flow is effected through the fluid control valve, the opening start position to be outputted from a position output part as position zero of the valve body,
 wherein the control program is configured to impart to a computer a function as the position output part configured to set, irrespective of positional information acquired by the positional information detection part at the opening start position of the valve body, the opening start position as position zero.

* * * * *